Patented Sept. 26, 1950

2,523,265

UNITED STATES PATENT OFFICE 2,523,265

OPHTHALMIC GLASS

William Houston Armistead, Corning, N. Y., assignor to Corning Glass Works, Corning, N. Y., a corporation of New York No Drawing. Application November 28, 1947, Serial No. 788,653

12 Claims. (Cl. 106—53)

This invention relates to transparent ophthalmic glasses, small buttons of which are to be sealed onto lenses of crown glass for the production of multifocal spectacle lenses. The glasses of this invention must meet certain requirements. Above all, they must have thermal expansion coefficients and softening points suitable for making proper seals with optical crown glasses. Softening point is that temperature at which a fibre of the glass of specified size will elongate under its own weight at a given rate when suspended through a small furnace of specified dimensions (Viscosity of Glass between the Strain Point and Melting Temperature, by H. R. Lillie, Jour. Am. Cer. Soc., vol. 14, page 502, July 1931). They must have good devitrification resistance during sealing and adequate chemical durability or resistance to weathering. Their purpose requires an index of refraction for the D line ($nD$) between 1.57 and 1.70 and it is desirable that they have a dispersive index ($\nu$) which is as high as possible. Prior ophthalmic glasses of high refractive index have a maximum dispersive index of about 32 which is less than desired. Prior glasses of lower refractive index have a maximum dispersive index of about 50 but have insufficient chemical durability.

The primary object of this invention is to provide ophthalmic glasses which have higher dispersive indices than has hitherto been obtainable in glasses of this type without sacrifice of other desirable properties.

Another object is to provide ophthalmic glasses having optical properties ranging from $nD=1.70$, preferably $nD=1.67$, $\nu=40$, to $nD=1.57$, preferably $nD=1.59$, $\nu=53$, but having at the same time good chemical durability, softening points below 750° C. and thermal expansion coefficients between $70 \times 10^{-7}$ and $97 \times 10^{-7}$ cm. per cm. per degree C. between 0° and 300° C.

In general, I have found that the above and other objects may be attained with glasses comprising 33% to 55% $SiO_2$, 1% to 7% $B_2O_3$, 2% to 15% $ZrO_2$, 0% to 28% BaO, 5% to 15% of alkali metal oxide other than lithia and consisting of $Na_2O$ or $Na_2O+K_2O$, 0% to 15% PbO, and an oxide of at least one metal of the second periodic group whose atomic weight is between 40 and 113; namely, Ca, Zn, Sr, or Cd, collectively amounting to from 3% to 30% but individually amounting to less than 15%, the glass containing at least two of said bivalent oxides PbO, CaO, ZnO, SrO, CdO, and BaO and the total percentage of the bivalent oxides being not less than 15% and not over 50%. Preferably, the new glasses comprise 35% to 47% $SiO_2$, 2% to 5% $B_2O_3$, 6% to 8% $ZrO_2$, 1% to 10% $TiO_2$, 15% to 25% BaO, 4% to 8% CaO, 3% to 12% ZnO or PbO or both, and 5% to 12% of alkali metal oxide other than lithia and consisting of $Na_2O$ or $Na_2O+K_2O$ in view of the following considerations.

For present purposes the chief deficiency of prior glasses is their high dispersion for light of different wave lengths, that is, their low dispersive index, which causes excessive color aberration. Although it may be absent, the present glasses preferably should contain BaO, because BaO raises the refractive index without unduly lowering the dispersive index. More than 28% BaO may cause devitrification. The new glasses preferably should contain 15% to 25% BaO. Since the use of BaO in such substantial amounts tends to raise the liquidus temperature of the glass objectionably, it is necessary to add one or more other bivalent oxides to prevent or counteract this. Bivalent oxides which are useful for this purpose are PbO, CaO, ZnO, SrO and CdO.

The use of PbO in small amounts, though not essential, is in some instances desirable, as for instance in glasses having $nD=1.65$ or above, because it raises the refractive index and helps to soften the glass. Since PbO tends to lower the dispersive index excessively, not more than about 15% thereof may be used.

CaO, ZnO, SrO and CdO also raise the refractive index. They are particularly valuable for further increasing the refractive index without causing devitrification in glasses having large BaO contents, but may also be added to the glass irrespective of the presence or absence of BaO. Up to 15% of each may thus be employed, provided their total does not exceed 30%. The new glasses preferably should contain 4% to 8% CaO and 3% to 12% ZnO or PbO or both. I have found that the combination and proportions of bivalent oxides which produce the optimum chemical durability, high refractive index together with a high dispersive index and a relatively low liquidus is 20% BaO, 5% CaO and 7.5% ZnO. Other oxides, if desired, may be added with benefit as follows:

$TiO_2$ may be incorporated in the glass with advantage to the optical properties and chemical durability. Both $TiO_2$ and $ZrO_2$ tend to raise the refractive index of the glass more than the other constituents but, whereas $ZrO_2$ has only a slight effect on the dispersive index, $TiO_2$ has a strong depressing effect on it. Hence, I prefer to use as much $ZrO_2$, between 2% and 15%, as will dissolve in the glass, and to add as much $TiO_2$ as possible without unduly lowering the dispersive index. Up to 10% or more $TiO_2$ may thus be added.

Up to 8% but preferably not over 5% $Al_2O_3$ may be added, preferably but not necessarily in lieu of $SiO_2$. Such addition increases the resistance of the glass to devitrification.

The expansion coefficient for suitable sealing to the optical crown glass will vary somewhat with softening point and with composition, and the new glasses will seal satisfactorily if their expansion coefficients are between $70 \times 10^{-7}$ and $97 \times 10^{-7}$ cm. per cm. per degree C. between 0° and 300° C.

The following compositions in weight percentage as calculated from their batches are given by way of example but not as limitations of the invention:

|  | 1 | 2 | 3 | 4 | 5 | 6 | 7 | 8 | 9 | 10 | 11 |
|---|---|---|---|---|---|---|---|---|---|---|---|
| $SiO_2$ | 43 | 46 | 40.5 | 46.5 | 52.5 | 47 | 49 | 39.5 | 43.5 | 44.5 | 39 |
| $B_2O_3$ | 5 | 4 | 4 | 4 | 4 | 5 | 2 | 5 | 4 | 4 | 3 |
| $ZrO_2$ | 7 | 7 | 6 | 7 | 3 | 10 | 10 | 7 | 7.5 | 7 | 7 |
| $BaO$ | 20 | 20 | 20 | 20 | 20 |  | 6 | 20 | 23.5 | 23.5 | 20 |
| $CaO$ | 5 | 5 | 10 | 5 |  | 10 | 5 | 5 | 5 | 8 | 5 |
| $ZnO$ |  |  | 10 | 7.5 | 7.5 | 12 | 12 | 7.5 | 4 |  |  |
| $CdO$ |  | 6 |  |  | 5 |  |  |  |  |  |  |
| $PbO$ | 5 |  |  |  |  |  |  |  |  |  | 10 |
| $Na_2O$ | 5 | 7 | 5.5 | 7 | 7 | 14 | 14 | 7 | 10 | 10 | 9 |
| $K_2O$ | 2 |  |  |  |  |  |  |  |  |  |  |
| $Al_2O_3$ |  | 2 |  |  |  | 2 | 2 |  |  |  |  |
| $TiO_2$ | 8 | 3 | 4 | 3 | 1 |  |  | 9 | 2.5 | 3 | 7 |
| Softening Point, degrees | 738 | 746 | 736 | 743 | 723 | 712 | 732 | 727 | 702 | 716 | 695 |
| Exp. Coeff. $\times 10^7$ | 80 | 81 | 84 | 80 | 76 | 88 | 88 | 82 | 94 | 94 | 93 |
| $nD$ | 1.653 | 1.616 | 1.641 | 1.616 | 1.583 | 1.606 | 1.584 | 1.664 | 1.616 | 1.616 | 1.660 |
| $\nu$ | 41.5 | 49.4 | 47.5 | 50.5 | 54.1 | 53.2 | 51.9 | 41.2 | 49.6 | 49.8 | 41 |

Composition 8 is particularly suitable for combination with a so-called hard crown glass having a softening point of 762° C. and an expansion coefficient of 81.

Compositions 9 and 11 are particularly suitable for combination with a crown glass having a refraction index $nD=1.523$, a softening point of 727° C. and an expansion coefficient of 93.

I claim:

1. A lithia-free ophthalmic glass which comprises 35% to 47% $SiO_2$, 2% to 5% $B_2O_3$, 6% to 8% $ZrO_2$, 5% to 12% of an alkali metal oxide selected from the class consisting of $Na_2O$ and a mixture of $Na_2O$ and $K_2O$, and approximately 20% BaO, 5% CaO, and 7.5% ZnO, and 1% to 10% $TiO_2$, the softening point being below 750° C., the refractive index ($nD$) being between 1.57 and 1.70, and the thermal expansion coefficient being between $70 \times 10^{-7}$ and $97 \times 10^{-7}$ cm. per cm. per °C. between 0° and 300° C.

2. A lithia-free ophthalmic glass which comprises 35% to 47% $SiO_2$, 2% to 5% $B_2O_3$, 6% to 8% $ZrO_2$, 1% to 10% $TiO_2$, 15% to 25% BaO, 4% to 8% CaO, 3% to 12% ZnO, and 5% to 12% of an alkali metal oxide selected from the class consisting of $Na_2O$ and a mixture of $Na_2O$ and $K_2O$, the softening point being below 750° C., the refractive index ($nD$) being between 1.57 and 1.70 and the thermal expansion coefficient being between $70 \times 10^{-7}$ and $97 \times 10^{-7}$ cm. per cm. per °C. between 0° and 300° C.

3. A lithia-free ophthalmic glass which comprises 35% to 47% $SiO_2$, 2% to 5% $B_2O_3$, 6% to 8% $ZrO_2$, 1% to 10% $TiO_2$, 15% to 25% BaO, 4% to 8% CaO, 3% to 12% PbO, and 5% to 12% of an alkali metal oxide selected from the class consisting of $Na_2O$ and a mixture of $Na_2O$ and $K_2O$, the softening point being below 750° C., the refractive index ($nD$) being between 1.57 and 1.70, and the thermal expansion coefficient being between $70 \times 10^{-7}$ and $97 \times 10^{-7}$ cm. per cm. per °C. between 0° and 300° C.

4. A lithia-free ophthalmic glass which comprises 35% to 47% $SiO_2$, 2% to 5% $B_2O_3$, 6% to 8% $ZrO_2$, 1% to 10% $TiO_2$, 15% to 25% BaO, 4% to 8% CaO, 3% to 12% ZnO+PbO, and 5% to 12% of an alkali metal oxide selected from the class consisting of $Na_2O$ and a mixture of $Na_2O$ and $K_2O$, the softening point being below 750° C., the refractive index ($nD$) being between 1.57 and 1.70, and the thermal expansion coefficient being between $70 \times 10^{-7}$ and $97 \times 10^{-7}$ cm. per cm. per °C. between 0° and 300° C.

5. An ophthalmic glass which consists approximately of 39.5% $SiO_2$, 5% $B_2O_3$, 7% $ZrO_2$, 20% BaO, 5% CaO, 7.5% ZnO, 7% $Na_2O$ and 9% $TiO_2$.

6. An ophthalmic glass which consists approximately of 43.5% $SiO_2$, 4% $B_2O_3$, 7.5% $ZrO_2$, 23.5% BaO, 5% CaO, 4% ZnO, 10% $Na_2O$ and 2.5% $TiO_2$.

7. An ophthalmic glass which consists approximately of 39% $SiO_2$, 3% $B_2O_3$, 7% $ZrO_2$, 20% BaO, 5% CaO, 10% PbO, 9% $Na_2O$ and 7% $TiO_2$.

8. A lithia-free ophthalmic glass which comprises 33% to 55% $SiO_2$, 1% to 7% $B_2O_3$, 2% to 15% $ZrO_2$, 5% to 15% of an alkali metal oxide selected from the group consisting of $Na_2O$ and mixtures of $Na_2O$ and $K_2O$, and at least two bivalent metal oxides in the indicated proportions selected from the group consisting of up to 28% BaO, up to 15% PbO, 3% to 15% CaO, 3% to 15% ZnO, 3% to 15% SrO, 3% to 15% CdO, and 3% to 30% of a mixture of a plurality of CaO, ZnO, SrO, and CdO, the maximum proportion of any such oxide in said mixture being 15%, the selected bivalent metal oxides including an oxide selected from the group consisting of CaO, ZnO, SrO, CdO, and a mixture of a plurality of such four oxides in the above-indicated proportion, the total percentage of the bivalent metal oxides being between 15% and 50%, the softening point being below 750° C., the refractive index ($nD$) being between 1.57 and 1.70, and the thermal expansion coefficient being between $70 \times 10^{-7}$ and $97 \times 10^{-7}$ cm. per cm. per °C between 0° and 300° C.

9. A lithia-free ophthalmic glass which comprises 33% to 55% $SiO_2$, 1% to 7% $B_2O_3$, 2% to 15% $ZrO_2$, 5% to 15% of an alkali metal oxide selected from the group consisting of $Na_2O$ and mixtures of $Na_2O$ and $K_2O$, and at least two bivalent metal oxides in the indicated proportions selected from the group consisting of up to 28% BaO, up to 15% PbO, 3% to 15% CaO, 3% to 15% ZnO, 3% to 15% SrO, 3% to 15% CdO, and 3 to 30% of a mixture of a plurality of CaO, ZnO, SrO, and CdO, the maximum proportion of any such oxide in said mixture being 15%, the selected bivalent metal oxides including BaO and an oxide selected from the group consisting of CaO, ZnO, SrO, CdO, and a mixture of a plurality of such four oxides in the above-indicated proportions, the total percentage of the bivalent metal oxides being between 15% and 50%, the softening point being below 750° C., the refractive index ($nD$) being between 1.57 and 1.70, and the thermal expansion coefficient being between $70 \times 10^{-7}$ and $97 \times 10^{-7}$ cm. per cm. per °C. between 0° and 300° C.

10. A lithia-free ophthalmic glass which comprises 33% to 55% $SiO_2$, 1% to 7% $B_2O_3$, 2% to 15% $ZrO_2$, 5% to 15% of an alkali metal oxide selected from the group consisting of $Na_2O$ and mixtures of $Na_2O$ and $K_2O$, 1% to 10% $TiO_2$, and at least two bivalent metal oxides in the indicated proportions selected from the group consisting of up to 28% BaO, up to 15% PbO, 3% to 15% CaO, 3% to 15% ZnO, 3% to 15% SrO, 3% to 15% CdO, and 3% to 30% of a mixture of a plurality of CaO, ZnO, SrO, and CdO, the maximum proportion of any such oxide being 15%, the selected bivalent metal oxides including BaO and an oxide selected from the group consisting of CaO, ZnO, SrO, CdO, and a mixture of a plurality of such four oxides in the above-indicated proportions, the total percentage of the bivalent metal oxides being between 15% and 50%, the softening point being below 750° C., the refractive index ($nD$) being between 1.57 and 1.70, and the thermal expansion coefficient being between $70 \times 10^{-7}$ and $97 \times 10^{-7}$ cm. per cm. per °C. between 0° and 300° C.

11. A lithia-free ophthalmic glass which comprises 33% to 55% $SiO_2$, 1% to 7% $B_2O_3$, 2% to 15% $ZrO_2$, 5% to 15% of an alkali metal oxide selected from the group consisting of $Na_2O$ and mixtures of $Na_2O$ and $K_2O$, and at least three bivalent metal oxides in the indicated proportions selected from the group consisting of up to 28% BaO, up to 15% PbO, 3% to 15% CaO, 3% to 15% ZnO, 3% to 15% SrO, 3% to 15% CdO, and 3 to 30% of a mixture of a plurality of CaO, ZnO, SrO, and CdO, the maximum proportion of any such oxide in said mixture being 15%, the selected bivalent metal oxides including BaO, PbO and an oxide selected from the group consisting of CaO, ZnO, SrO, CdO, and a mixture of a plurality of such four oxides in the above-indicated proportions, the total percentage of the bivalent metal oxides being between 15% and 50%, the softening point being below 750° C., the refractive index ($nD$) being between 1.57 and 1.70, and the thermal expansion coefficient being between $70 \times 10^{-7}$ and $97 \times 10^{-7}$ cm. per cm. per °C. between 0° and 300° C.

12. A lithia-free ophthalmic glass which comprises 33% to 55% $SiO_2$, 1% to 7% $B_2O_3$, 2% to 15% $ZrO_2$, 5% to 15% of an alkali metal oxide selected from the group consisting of $Na_2O$ and mixtures of $Na_2O$ and $K_2O$, 1% to 10% $TiO_2$, and at least three bivalent metal oxides in the indicated proportions selected from the group consisting of up to 28% BaO, up to 15% PbO, 3% to 15% CaO, 3% to 15% ZnO, 3% to 15% SrO, 3% to 15% CdO, and 3% to 30% of a mixture of a plurality of CaO, ZnO, SrO, and CdO, the maximum proportion of any such oxide in said mixture being 15%, the selected bivalent metal oxides including BaO, PbO and an oxide selected from the group consisting of CaO, ZnO, SrO, CdO, and a mixture of a plurality of such four oxides in the above-indicated proportions the total percentage of the bivalent metal oxides being between 15% and 50%, the softening point being below 750° C., the refractive index ($nD$) being between 1.57 and 1.70, and the thermal expansion coefficient being between $70 \times 10^{-7}$ and $97 \times 10^{-7}$ cm. per cm. per °C. between 0° and 300° C.

WILLIAM HOUSTON ARMISTEAD.

REFERENCES CITED

The following references are of record in the file of this patent:

UNITED STATES PATENTS

| Number | Name | Date |
|---|---|---|
| 1,765,287 | Scott | June 17, 1930 |
| 1,943,051 | Berger | Jan. 9, 1934 |
| 2,297,453 | Berger et al. | Sept. 29, 1942 |
| 2,431,983 | Bastick et al. | Dec. 2, 1947 |
| 2,433,883 | Armistead | Jan. 6, 1948 |
| 2,435,995 | Armistead | Feb. 17, 1948 |